(12) United States Patent
Mohammadpour et al.

(10) Patent No.: US 9,705,442 B2
(45) Date of Patent: Jul. 11, 2017

(54) ASYMMETRICAL MULTI-LANE MULTI-PHASE MOTOR DRIVES

(71) Applicants: Ali Mohammadpour, Troy, NY (US); Leila Parsa, Troy, NY (US)

(72) Inventors: Ali Mohammadpour, Troy, NY (US); Leila Parsa, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 147 days.

(21) Appl. No.: 14/335,500

(22) Filed: Jul. 18, 2014

(65) Prior Publication Data

US 2015/0069949 A1 Mar. 12, 2015

Related U.S. Application Data

(60) Provisional application No. 61/847,764, filed on Jul. 18, 2013.

(51) Int. Cl.
*H02P 1/46* (2006.01)
*H02P 1/32* (2006.01)
*H02P 25/22* (2006.01)
*H02K 3/28* (2006.01)
*H02P 29/032* (2016.01)
*H02P 3/18* (2006.01)

(52) U.S. Cl.
CPC ............. *H02P 25/22* (2013.01); *H02K 3/28* (2013.01); *H02P 29/032* (2016.02); *H02P 3/18* (2013.01)

(58) Field of Classification Search
CPC .......... H02P 25/22; H02P 29/022; H02K 3/28
See application file for complete search history.

(56) References Cited

U.S. PATENT DOCUMENTS

| 6,242,884 | B1* | 6/2001 | Lipo ..................... H02P 3/18 318/496 |
| 6,426,605 | B1 | 7/2002 | Toliyat et al. |
| 6,710,495 | B2 | 3/2004 | Lipo et al. |
| 6,791,226 | B1 | 9/2004 | Dhawan |
| 6,831,430 | B2 | 12/2004 | Edelson |
| 7,816,805 | B2 | 10/2010 | Tanaka et al. |
| 7,847,437 | B2* | 12/2010 | Chakrabarti ........ B60L 11/1887 307/82 |
| 8,283,881 | B2 | 10/2012 | Gallegos-Lopez et al. |
| 8,395,469 | B2* | 3/2013 | Skibinski ................ H01F 30/14 336/148 |

OTHER PUBLICATIONS

Fu, Jen-Ren et al., "Disturbance-Free Operation of a Multiphase Current-Regulated Motor Drive with an Opened Phase," *IEEE Transactions on Industry Applications*, 1994, 30(5):1267-1274.
Kestelyn, Xavier et al., "A Vectorial Approach for Generation of Optimal Current References for Multiphase Permanent-Magnet Synchronous Machines in Real Time," *IEEE Transactions on Industrial Electronics*, 2011, 58(11):5057-5065.
Levi, E. et al., "Multiphase induction motor drives—a technology status review," *IET Electr. Power Appl.*, 2007, 1(4):489-516.

* cited by examiner

*Primary Examiner* — Bentsu Ro
*Assistant Examiner* — Zemenay Truneh
(74) *Attorney, Agent, or Firm* — Saliwanchik, Lloyd & Eisenschenk (57) ABSTRACT

Motor drives and drive systems are provided. A motor drive of the subject invention can be an asymmetrical, multi-lane, multi-phase motor drive. The motor drive can include a master lane and slave lane having fewer phases than the master lane has. Each lane can be powered by a single direct current link.

20 Claims, 10 Drawing Sheets

ASYMMETRICAL MULTI-LANE MULTI-PHASE MOTOR DRIVES

CROSS-REFERENCE TO RELATED APPLICATION

The present application claims the benefit of U.S. Provisional Application Ser. No. 61/847,764, filed Jul. 18, 2013, which is hereby incorporated by reference herein in its entirety, including any figures, tables, and drawings.

BACKGROUND

Multi-phase motor drives, including induction motors and permanent magnet motors, are used in a wide variety of applications, due to their inherent redundancy and high reliability. Multi-phase motors offer fault-tolerant operation under faults in motor windings and converter switches. The drive system of a conventional multi-phase motor is usually based on an inverter connected to a direct current (DC) source. This system has drawbacks, including dependency on single DC link and physical/electrical connection between motor phases. In addition, a modular-phase system requires multiple isolated DC sources and multiple full-bridge inverters, which results in a very expensive, complex, and bulky system.

Symmetrical multi-fed drives based on three-phase modules are of special interest in safety critical applications. They offer simple control under a fault condition. However, even a single open-circuit fault of one switch or winding will cause complete interruption of a faulty module. Furthermore, straightforward extension of a symmetrical multi-fed drive concept into multi-phase motors will result in a drive with a high component count. For example, a symmetrical two-fed drive based on two five-phase, five-leg bridges requires 20 switches.

BRIEF SUMMARY

The subject invention provides novel and advantageous motor drives and drive systems, as well as methods of manufacturing and using such motor drives and drive systems. In many embodiments, a motor drive of the subject invention is an asymmetrical multi-lane motor drive. In many embodiments, a motor drive is also a multi-phase motor drive (e.g., an asymmetrical, multi-lane, multi-phase motor drive).

In an embodiment, a motor drive can include a plurality of lanes and can be a multi-phase motor drive and have an asymmetrical topology. At least one lane of the plurality of lanes can have a different number of phases from at least one other lane of the plurality of lanes. Each lane can be electrically isolated from each other, and each lane can include a switch In another embodiment, a method of driving a motor can include: providing a motor drive; and driving the motor using the motor drive. The motor drive can include a plurality of lanes and can be a multi-phase motor drive and have an asymmetrical topology. At least one lane of the plurality of lanes can have a different number of phases from at least one other lane of the plurality of lanes. Each lane can be electrically isolated from each other, and each lane can include a switch.

BRIEF DESCRIPTION OF THE DRAWINGS

The patent or application file contains at least one drawing executed in color. Copies of this patent or patent application publication with color drawings will be provided by the Patent Office upon request and payment of the necessary fee.

DETAILED DISCLOSURE

The subject invention provides novel and advantageous motor drives and drive systems, as well as methods of manufacturing and using such motor drives and drive systems. In many embodiments, a motor drive of the subject invention is an asymmetrical multi-lane motor drive. In many embodiments, a motor drive is also a multi-phase motor drive (e.g., an asymmetrical, multi-lane, multi-phase motor drive). The motor drive or drive system can have an asymmetrical drive architecture. At least one lane of the motor drive or drive system can have a different number of phases from at least one other lane of the motor drive or drive system.

Symmetrical drive systems for multi-phase motors include modular phase multi-lane drive motors with single-phase inverters, as well as motors based on a single-lane, multi-leg inverter. While the former has a high level of fault-tolerance, the latter can be more cost-effective. Embodiments of the subject invention include asymmetrical multi-inverter drive systems that can provide a complete spectrum of solutions for different application. Also, drive systems of the subject invention can exhibit fault-tolerant control for disturbance-free or nearly disturbance-free operation of multi-phase machines (e.g., multi-phase permanent magnet machines) under fault conditions. Fault-tolerant control ensures the following features in spite of faults (open-circuit and short-circuit) in motor winding and/or inverter switches: a) high-performance speed regulation with field-oriented control; b) high ripple-free output torque (e.g., maximum achievable ripple-free torque) under all operating conditions; c) low power loss (e.g., minimum power loss) of the machine under all operating conditions; and d) real-time implementation.

Multi-phase motors offer fault-tolerant operation under faults in motor windings and converter switches, but to have a truly fault-tolerant drive system in safety-critical applications, redundancy in power supply is critical. The electric drive system should be able to deliver acceptable performance under failure of one (or more) of the power supplies.

The drive system of a multi-phase motor is usually based on a multi-leg inverter connected to a DC source, but conventional multi-phase drive systems have two main drawbacks: dependency on a single DC link; and physical/electrical connection between motor phases. A modular-phase multi-fed drive system includes no connection between phase windings, and each phase is connected to an isolated DC link through a single-phase full-bridge inverter. This modular-phase design offers high reliability due to magnetic, thermal, and physical isolation between motor phases. However, it requires multiple isolated DC sources and multiple full-bridge inverters, which results in a very expensive, complex, and bulky system. A single DC link can be shared for full-bridge inverters, where a DC capacitor of each full-bridge is connected in series with a fuse and then connected in parallel to a single DC source. This approach could be useful under capacitor failure, but it still relies on a single DC source, and a drive operating from a single power source cannot offer true fault tolerance. Further, in symmetrical multi-fed drives based on three-phase modules, even a single open-circuit fault of one switch or winding will cause complete interruption of faulty module.

Figure 1:
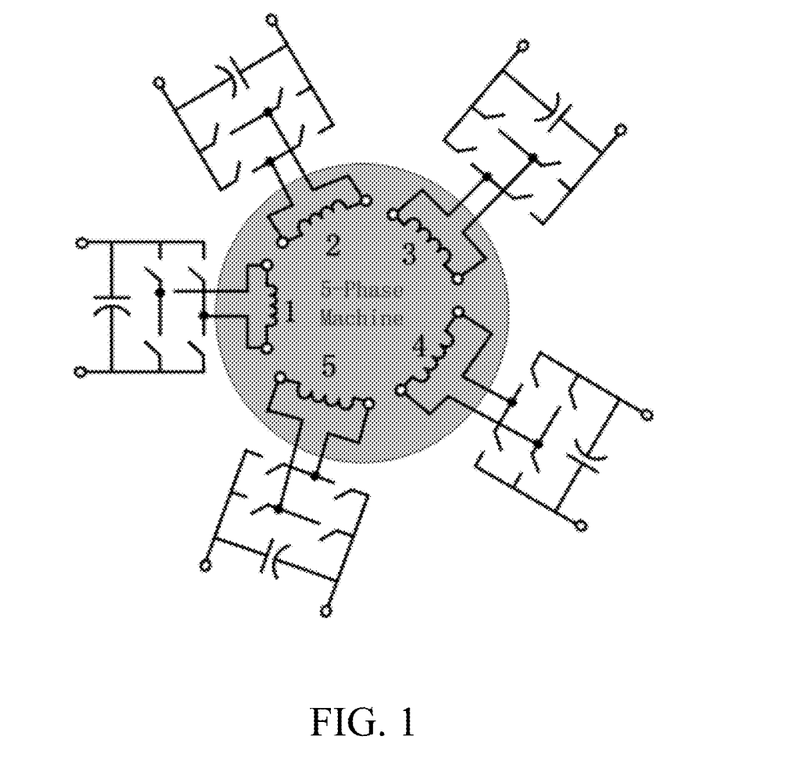
FIG. 1 shows a schematic view of a symmetrical, multi-lane, multi-phase drive system.
Figure 2:
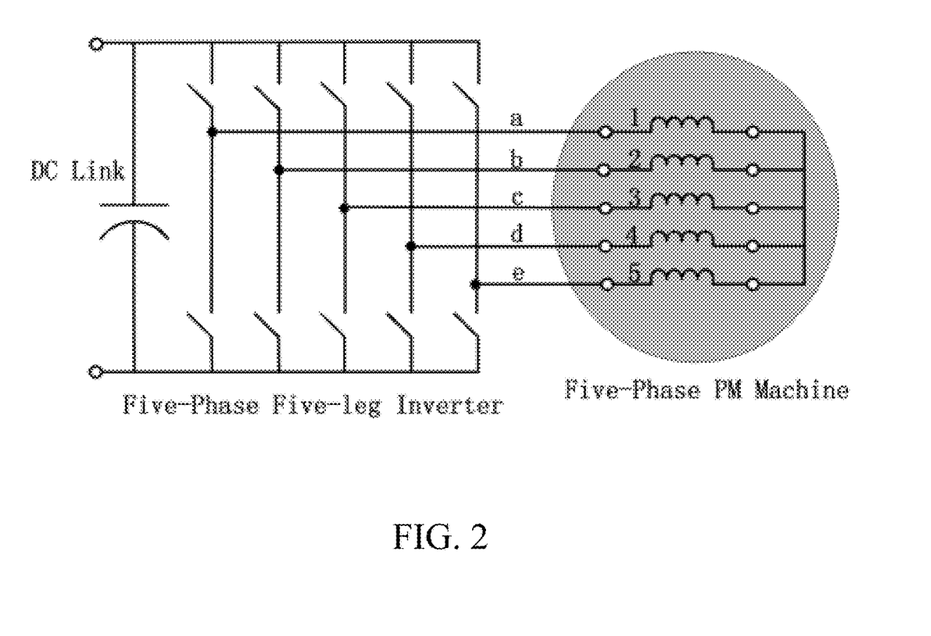
FIG. 2 shows a schematic view of a symmetrical, single-lane drive system.
Figure 10:
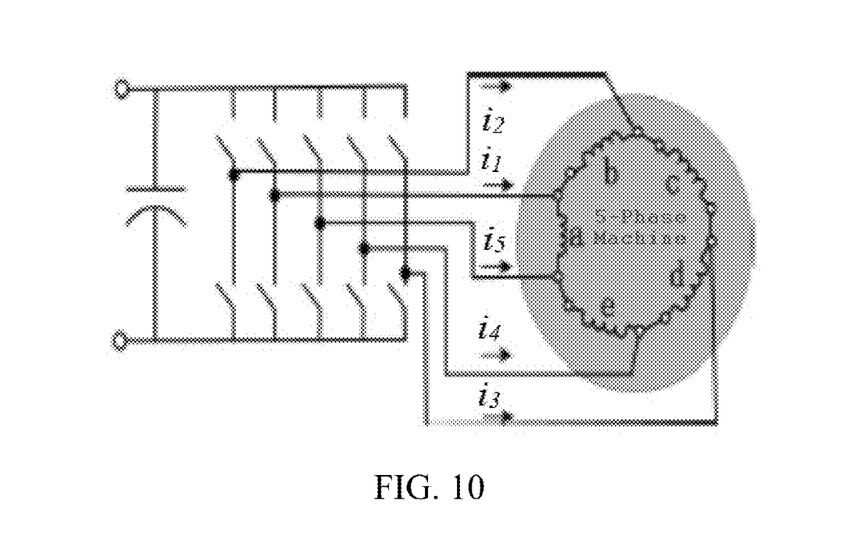
FIG. 10 shows schematic view of a symmetrical drive system.

FIG. 1 shows a schematic view of a symmetrical, multi-lane, multi-phase drive system, FIG. 2 shows a schematic of a symmetrical single-lane drive system using a five-leg inverter, and FIG. 10 shows a schematic view of a symmetrical, single-lane, multi-phase drive system. Referring to FIG. 1, a symmetrical five-lane modular drive system architecture can be reliable due to high redundancy in all components of the system. However, it requires five isolated DC links and 20 switches to implement five full-bridge inverters. Referring to FIG. 2, continued operation of the drive system is dependent on a single DC link, and this is undesirable in most safety-critical applications. Referring to FIG. 10, a symmetrical single-lane drive system can use a five-leg inverter. A pentagon connection is shown for the five-phase motor but other alternatives, such as a star or a pentacle may be used. This configuration offers fault tolerance under faults in motor windings and converter switches, but continued operation of the drive system is dependent on the availability of its single DC link. This is undesirable in most safety-critical applications.

Mathematically, for a symmetrical l-lane drive, output torque under single DC-link failure is independent of the number of motor phases and is given by Equation (1):

$$T_{max,l} = \frac{l-1}{l} \quad (1)$$

where l is the number of drive lanes. For instance, the output torque of a single-lane drive (FIG. 10) under DC-link failure is zero, but the maximum output torque of the five-lane drive (FIG. 1) is 80% of the nominal torque of the drive. On the other hand, for a single fault in one phase of an n-phase motor in a symmetrical drive, the maximum output torque is independent of the number of lanes and is given by Equation (2):

$$T_{max,n} = \frac{n-1}{n} \quad (2)$$

where n is number of motor phases. For example, the symmetrical drives of FIGS. 1 and 10 will each offer up to 80% of their nominal torque under single-phase fault in motor windings. It should be noted that $T_{max,n}$ is the maximum achievable torque, but in practice, output torque is often less than the ideal number obtained from Equation (2) depending on the electromagnetic design of the motor, winding connection(s), and control algorithm.

Embodiments of the subject invention provide a new class of multi-phase drive systems that offer higher reliability than single-lane drive and lower cost than multi-lane (e.g., five-lane) drive. A motor drive or drive system of the subject invention can be an asymmetrical, multi-lane drive and can offer higher flexibility in system design to address different reliability requirements and cost limits of any specific application. In many embodiments, each lane can represent a set of interconnected phase windings isolated from the rest of the system and supplied by a DC link through a multi-leg inverter. Each lane can include one or more switches. While symmetrical single-lane drives are simple but lack sufficient reliability and symmetrical multi-lane designs are reliable but complex and expensive, the drives according to embodiments of the subject fill the gap in the design space by introducing asymmetry in the drive system architecture.

Conventional multi-fed drives have symmetrical architecture with an equal number of phases on each system module. In many embodiments of the subject invention, though, a multi-phase, multi-lane drive has an asymmetrical topology (e.g., at least one lane has a different number of phases from at least one other lane). Each lane can represent a set of interconnected motor windings isolated (e.g., electrically isolated) from the rest of the motor windings. Each lane can be supplied by, e.g., a DC link, and can be supplied through, for example, a multi-leg inverter.

Figure 3:
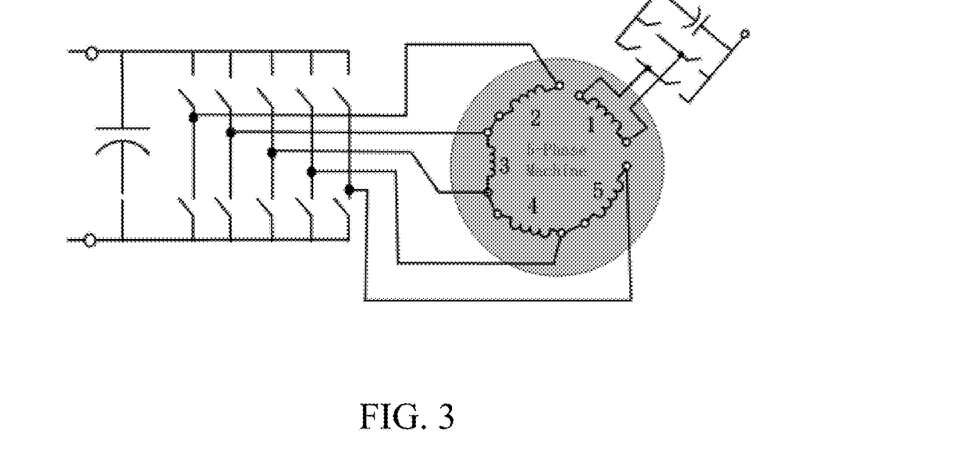
FIG. 3 shows a schematic view of an asymmetrical, multi-lane, multi-phase drive system according to an embodiment of the subject invention.
Figure 4:
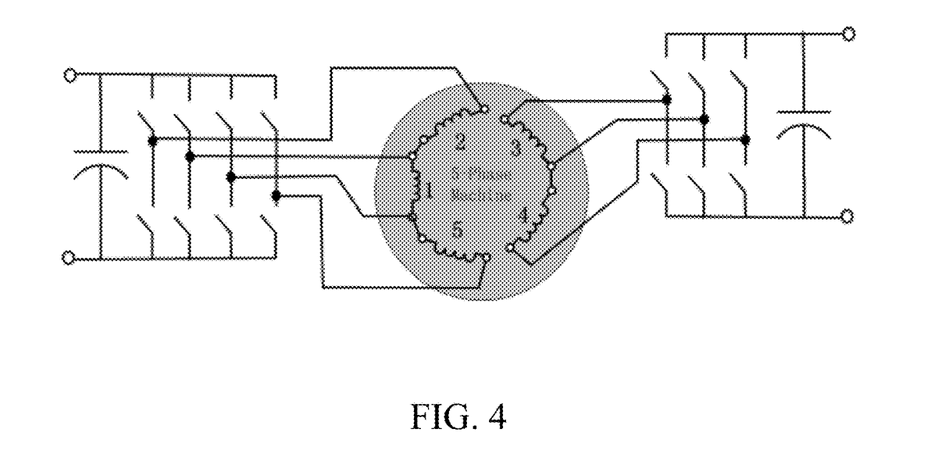
FIG. 4 shows a schematic view of an asymmetrical, multi-lane, multi-phase drive system according to an embodiment of the subject invention.
Figure 5:
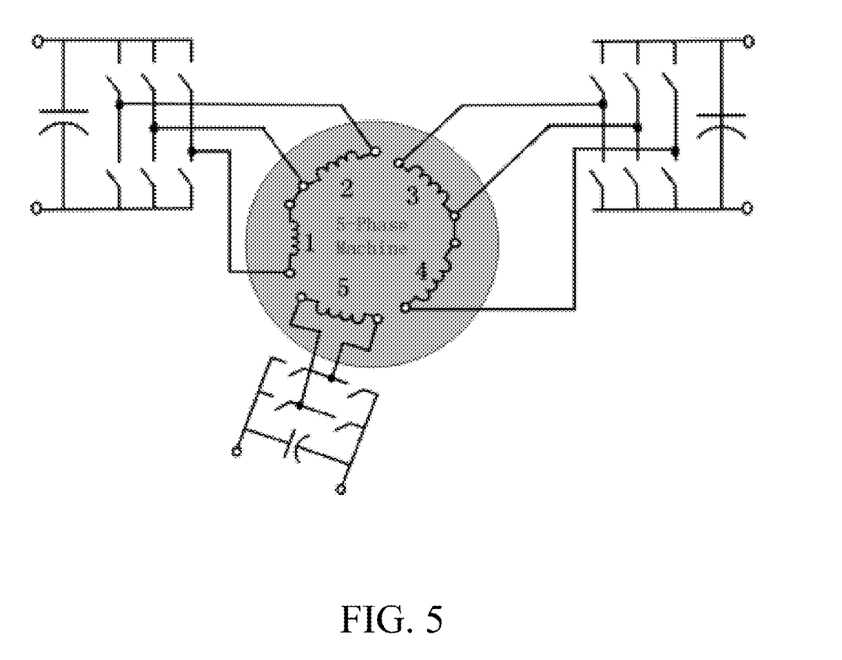
FIG. 5 shows a schematic view of an asymmetrical, multi-lane, multi-phase drive system according to an embodiment of the subject invention.
Figure 6:
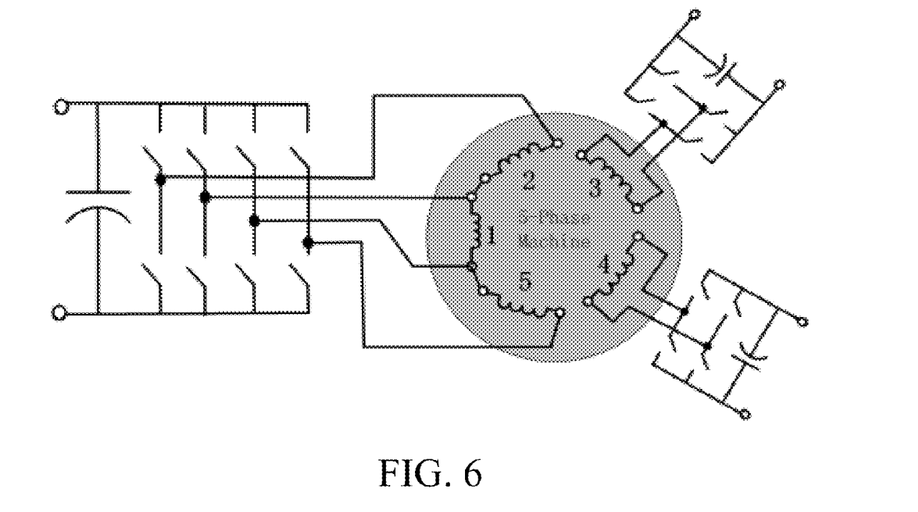
FIG. 6 shows a schematic view of an asymmetrical, multi-lane, multi-phase drive system according to an embodiment of the subject invention.
Figure 7:
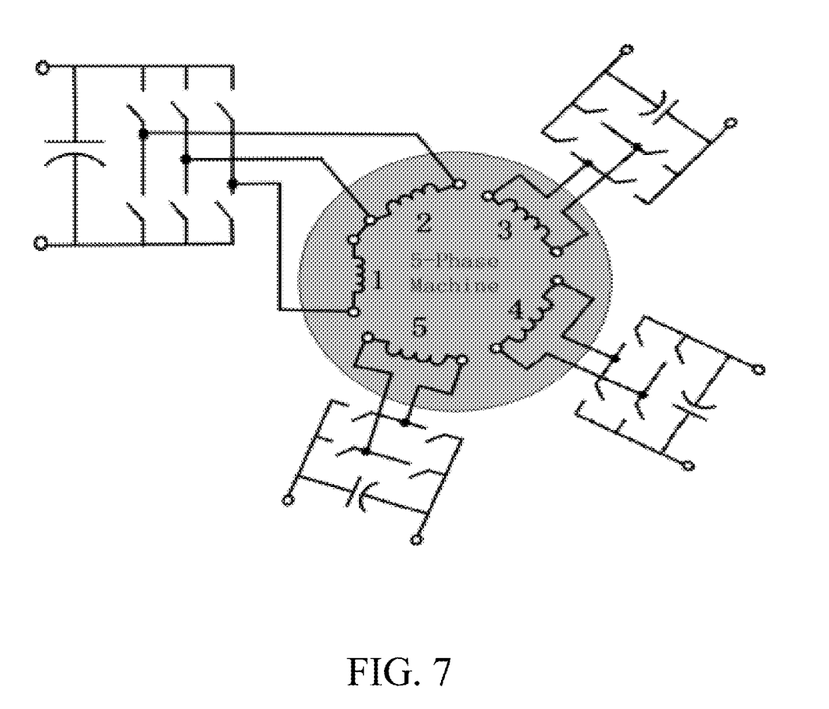
FIG. 7 shows a schematic view of an asymmetrical, multi-lane, multi-phase drive system according to an embodiment of the subject invention.

FIGS. 3-7 each shows a schematic view of an asymmetrical, multi-lane, multi-phase drive system according to an embodiment of the subject invention. FIGS. 3 and 4 show 2-lane systems; FIGS. 5 and 6 show 3-lane systems; and FIG. 7 shows a 4-lane system. Though 2-, 3-, and 4-lane systems are shown for exemplary purposes, embodiments are not limited thereto. A motor drive or drive system according to the subject invention can have 5, 6, 7, 8, 9, 10, 11, 12, 13, 14, 15, 16, 17, 18, 19, 20, or more lanes. The number of lanes of a motor drive or drive system can be, for example, any of the following values, no more than any of the following values, at least any of the following values, or within any range having any of the following values as endpoints: 2, 3, 4, 5, 6, 7, 8, 9, 10, 11, 12, 13, 14, 15, 16, 17, 18, 19, or 20.

In addition, though 5-phase systems are shown in FIGS. 3-7 for exemplary purposes, embodiments are not limited thereto. The number of phases of a motor drive or drive system can be, for example, any of the following values, no more than any of the following values, at least any of the following values, or within any range having any of the following values as endpoints: 2, 3, 4, 5, 6, 7, 8, 9, 10, 11, 12, 13, 14, 15, 16, 17, 18, 19, or 20. For example, any suitable number of phases can be included in a motor drive or drive system according to embodiments of the subject invention.

Also, though pentagon-based interconnections are shown for a 5-phase machine for exemplary purposes, embodiments are not limited thereto. Other types of interconnections can be used for a 5-phase machine, including but not limited to star or pentacle interconnections.

Furthermore, the control architecture shown and described herein for the motor drives or drive systems according to embodiments of the subject invention are for exemplary purposes only and are not meant to be construed as limiting. Any suitable control architecture known in the art can be used for any lane of a motor drive or drive system according to embodiments of the subject invention.

Though all lanes are identical in a symmetrical drive architecture, there are (at least) two types of lanes for an asymmetrical design: the lane(s) with a higher number of interconnected phases; and the lane(s) with a lower number of interconnected phases. These lanes can be referred to as a master lane and a slave lane, respectively. A higher number of lanes results in an increased number of isolated DC sources and higher reliability. Referring to FIGS. 3 and 4, two design possibilities are shown for a 2-lane design. FIG. 3 shows a 2-41 design, and FIG. 4 shows a 2-32 design, where the number before the hyphen is the number of lanes and the numbers after the hyphen represent the number of interconnected phases in the master lane(s) (first number after the hyphen) and the slave lane(s) (second number after the hyphen). For example, the five-phase drive of FIG. 4 (2-32) has two lanes, where the master lane is a 3-phase lane and the slave lane is a 2-phase land.

Referring to FIGS. 5 and 6, two design possibilities are shown for a 3-lane design. FIG. 5 shows a 3-21 design, where each master lane is a 2-phase lane and the slave lane is a 1-phase lane. FIG. 6 shows a 3-31 design, where the master lane is a 3-phase lane, and each slave lane is a 1-phase lane.

Referring to FIG. 7, one design possibility for a 4-lane design is shown. The design is a 4-21 design, where the mater lane is a 2-phase lane, and each slave lane is a 1-phase lane. Three of the motor phases are each supplied by an independent isolated source and the two remaining phases are connected to make a lane and share one DC source. Maximum available torque of asymmetrical drives under different fault conditions will depend on certain faulty lanes. Master lane failure is more severe than slave lane failure as the master lane is connected to a higher number of motor phases. A high degree of freedom exists in feasible configurations of asymmetrical drives for multi-phase motors with higher numbers of phases.

In many embodiments, an asymmetrical motor drive or drive system includes at least one master lane and at least one slave lane. Any number of master lanes and slave lanes can be present, and the phases of the motor can be divided among the lanes in any suitable manner. In one embodiment, a five-phase motor can have a 3-phase master lane and two 1-phase slave lanes. In another embodiment, a five-phase motor can have a 2-phase master lane and three 1-phase slave lanes. In yet another embodiment, a five-phase motor can have two 2-phase master lanes and one 1-phase slave lane. In yet another embodiment, a five-phase motor can have a 4-phase master lane and a 1-phase slave lane. In yet another embodiment, a five-phase motor can have a 3-phase master lane and a 2-phase slave lane.

Figure 9:
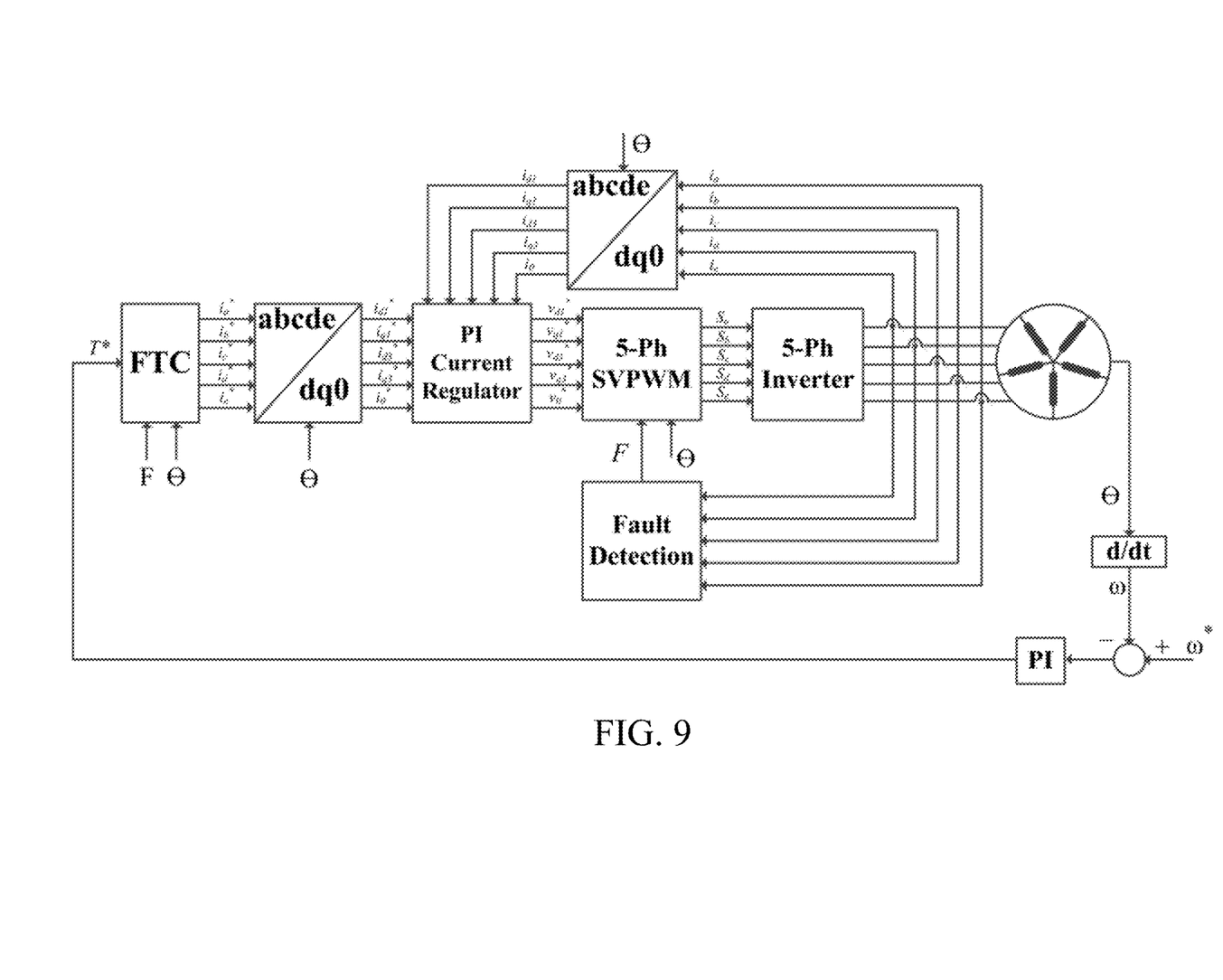
FIG. 9 is a block diagram of fault-tolerant vector control of a five-phase drive system according to an embodiment of the subject invention.

FIG. 9 is a block diagram of fault-tolerant vector control of a five-phase drive system according to an embodiment of the subject invention. The system can control the speed of a five-phase permanent magnet machine using a five-phase PWM inverter. Angular position of the machine can be measured using a position sensor or estimated using sensorless position estimation techniques. Speed of the machine can be regulated using a closed-loop PI controller that sets reference torque of the machine. The fault detection module can be used to detect the occurrence of faults in the machine and generate a corresponding fault matrix. The FTC module can calculate reference currents of all five phases based on reference torque command as well as fault information from the fault detection module and position information from the sensor position. The five-phase reference currents can be calculated such that ripple-free or nearly ripple-free torque is achieved with minimum power loss under all operating conditions. The reference currents can then be transformed to dq0 space. Motor currents can be measured using current sensors and then transformed to dq0 variables. The current can be regulated via a PI current compensator that sets reference voltage for all five phases. An SVPWM module can calculate switching instants of the five-phase inverter using reference voltages, fault information, and position information.

In an embodiment of the subject invention, a method of driving a motor can include providing a motor drive or drive system as described herein and driving the motor with the motor drive or drive system.

In an embodiment of the subject invention, a method of manufacturing a motor drive or drive system as described herein can include providing the parts of the motor drive or drive system and assembling the parts.

EXEMPLIFIED EMBODIMENTS

The invention includes, but is not limited to, the following embodiments:

Embodiment 1

A motor drive, comprising:
a plurality of lanes,
wherein the motor drive is a multi-phase motor drive, and
wherein the motor drive has an asymmetrical topology.

Embodiment 2

The motor drive according to embodiment 1, wherein at least one lane of the plurality of lanes has a different number of phases from at least one other lane of the plurality of lanes Embodiment 3

The motor drive according to any of embodiments 1-2, wherein each lane of the plurality of lanes is electrically isolated from every other lane of the plurality of lanes.

Embodiment 4

The motor drive according to any of embodiments 1-3, wherein each lane of the plurality of lanes comprises a switch Embodiment 5

The motor drive according to any of embodiments 1-4, wherein each lane is supplied power by a direct current (DC) link, respectively.

Embodiment 6

The motor drive according to any of embodiments 1-5, wherein each lane is supplied power through a multi-leg inverter, respectively.

Embodiment 7

The motor drive according to any of embodiments 1-6, comprising at least three lanes.

Embodiment 8

The motor drive according to any of embodiments 1-6, comprising at least four lanes.

Embodiment 9

The motor drive according to any of embodiments 1-6, comprising exactly two lanes.

Embodiment 10

The motor drive according to any of embodiments 1-6, comprising at least five lanes.

Embodiment 11

The motor drive according to any of embodiments 1-6, comprising at least six lanes.

Embodiment 12

The motor drive according to any of embodiments 1-11, wherein the plurality of lanes comprises a master lane and a slave lane, wherein the master lane has a higher number of interconnected phases than the slave lane has.

Embodiment 13

The motor drive according to any of embodiments 1-12, wherein the motor drive is a 6-phase motor drive.

Embodiment 14

The motor drive according to any of embodiments 1-12, wherein the motor drive is a 7-phase motor drive.

Embodiment 15

The motor drive according to any of embodiments 1-12, wherein the motor drive is an 8-phase motor drive.

Embodiment 16

The motor drive according to any of embodiments 1-12, wherein the motor drive is a 9-phase motor drive.

Embodiment 17

The motor drive according to any of embodiments 1-12, wherein the motor drive is a 10-phase motor drive.

Embodiment 18

The motor drive according to any of embodiments 1-17, wherein the motor drive is a 5-phase motor drive, and wherein the plurality of lanes comprises a 4-phase master lane and a 1-phase slave lane.

Embodiment 19

The motor drive according to any of embodiments 1-17, wherein the motor drive is a 5-phase motor drive, and wherein the plurality of lanes comprises a 3-phase master lane and a 2-phase slave lane.

Embodiment 20

The motor drive according to any of embodiments 1-17, wherein the motor drive is a 5-phase motor drive, and wherein the plurality of lanes comprises two 2-phase master lanes and a 1-phase slave lane.

Embodiment 21

The motor drive according to any of embodiments 1-17, wherein the motor drive is a 5-phase motor drive, and wherein the plurality of lanes comprises a 3-phase master lane and two 1-phase slave lanes.

Embodiment 22

The motor drive according to any of embodiments 1-17, wherein the motor drive is a 5-phase motor drive, and wherein the plurality of lanes comprises a 2-phase master lane and three 1-phase slave lanes.

Embodiment 23

The motor drive according to any of embodiments 1-12, wherein the motor drive is a 2-phase motor drive.

Embodiment 24

The motor drive according to any of embodiments 1-12, wherein the motor drive is a 3-phase motor drive.

Embodiment 25

The motor drive according to any of embodiments 1-12, wherein the motor drive is a 4-phase motor drive.

Embodiment 26

A method of driving a motor, comprising:
providing the motor drive according to any of embodiments 1-25; and driving the motor using the motor drive.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

EXAMPLE 1

Asymmetrical drive architectures according to embodiments of the subject invention were compared to conventional symmetrical drive systems in terms of reliability and cost/complexity. Reliability was assessed by comparison of maximum achievable torque under single open-circuit fault condition (either in motor winding or inverter switches) and maximum available torque under failure of one DC link. Cost and complexity of the system were evaluated by the number of switches and number of isolated DC sources. For the symmetrical single-lane 1-50 drive (where the number before the hyphen represents the number of lanes, the first number after the hyphen represents the number of phases for any master lane(s), and the second number after the hyphen represents the number of phases for any slave lane(s)), only one DC source is required with 10 switches. The number of switches and isolated DC sources appears to be directly related to the number of lanes of the drive system. Assuming a proper fault-tolerant control scheme, the maximum achievable torque is comparable for all drive architectures under a single open-circuit fault in motor winding or inverter switches. However, reliability of the system in terms of resiliency against DC link failure is higher for systems with a higher number of lanes.

Figure 8:
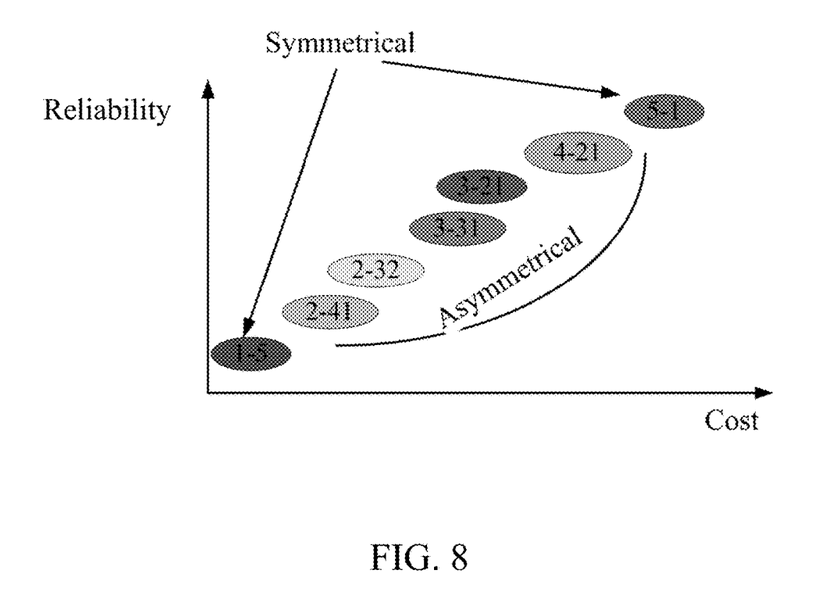
FIG. 8 shows a graphical representation of reliability versus cost.

A comprehensive comparison of symmetrical and asymmetrical five-phase drives in terms of cost and reliability is presented in Table 1. It can be seen that, out of two available options for two-lane designs, 2-32 (as shown in FIG. 4) is preferred 2-41 (as shown in FIG. 3). In addition, a three-lane, 3-21 (as shown in FIG. 5) drive is advantageous over a 3-31 drive (as shown in FIG. 6) in terms of maximum available torque under slave lane failure. The drive system may fail to provide torque under master lane failure in an asymmetrical 2-41 drive (as shown in FIG. 3). FIG. 8 shows a graphical representation of reliability versus cost for symmetrical drive systems and asymmetrical drive systems according to embodiments of the subject invention. It can be seen that while symmetrical designs are at the two ends of the spectrum, asymmetrical designs according to embodiments of the subject invention cover the gap by offering flexibility in selection of drive system design based on reliability requirements and cost limitations.

TABLE 1

Comparison of five-phase drive architectures

| | Drive Architecture | | | | | | |
|---|---|---|---|---|---|---|---|
| | 5 - 10 | 4 - 21 | 3 - 21 | 3 - 31 | 2 - 41 | 2 - 32 | 1 - 50 |
| Number of switches | 20 | 18 | 16 | 16 | 14 | 14 | 10 |
| Number of isolated lanes | 5 | 4 | 3 | 3 | 2 | 2 | 1 |
| Max torque (open-circuit fault) | 0.8 | 0.8 | 0.8 | 0.8 | 0.8 | 0.8 | 0.8 |
| Max torque (master/slave DC link failure) | 0.8 | 0.6/0.8 | 0.6/0.8 | 0.4/0.8 | 0.0/0.8 | 0.4/0.6 | 0.0 |

EXAMPLE 2

Figure 12:
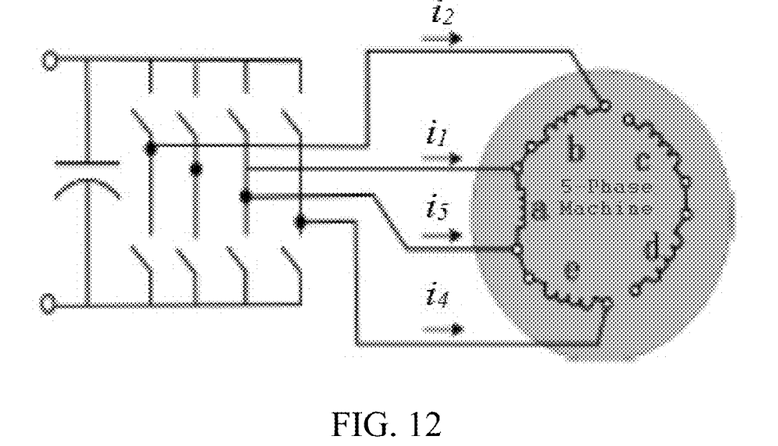
FIG. 12 shows schematic view of an asymmetrical drive system according to an embodiment of the subject invention.
Figure 14:
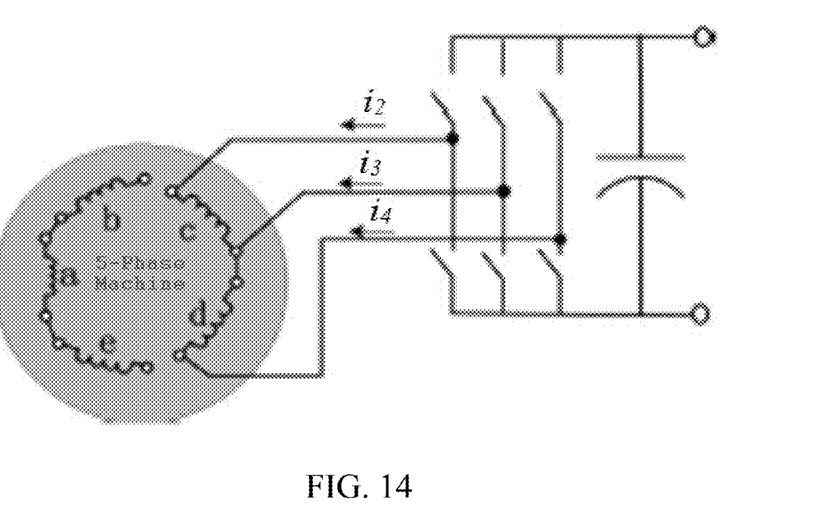
FIG. 14 shows schematic view of an asymmetrical drive system according to an embodiment of the subject invention.

Performance of a symmetrical 1-50 drive (where the number before the hyphen represents the number of lanes, the first number after the hyphen represents the number of phases for any master lane(s), and the second number after the hyphen represents the number of phases for any slave lane(s)), under normal operation, an asymmetrical 2-32 two-lane drive under master link failure are investigated, and the asymmetrical 2-32 two-lane drive under slave link failure was investigated. Schematic representations of these motor drives are shown in FIGS. 10, 12, and 14, respectively.

The motor was a five-phase permanent magnet (PM) motor. The test motor was a four-pole five-phase PM motor with trapezoidal back EMF. The stator of the machine had 15 slots with double-layer windings. The inner diameter of the stator, the outer diameter of stator, and the stack length of the machine were 65 mm, 120 mm, and 80 mm, respectively. The air-gap length of the machine was 0.5 mm. The PMs were NdFeBr with residual flux density, $B_r$=1.2 T. A single digital controller was used to control both lanes.

Figure 11:
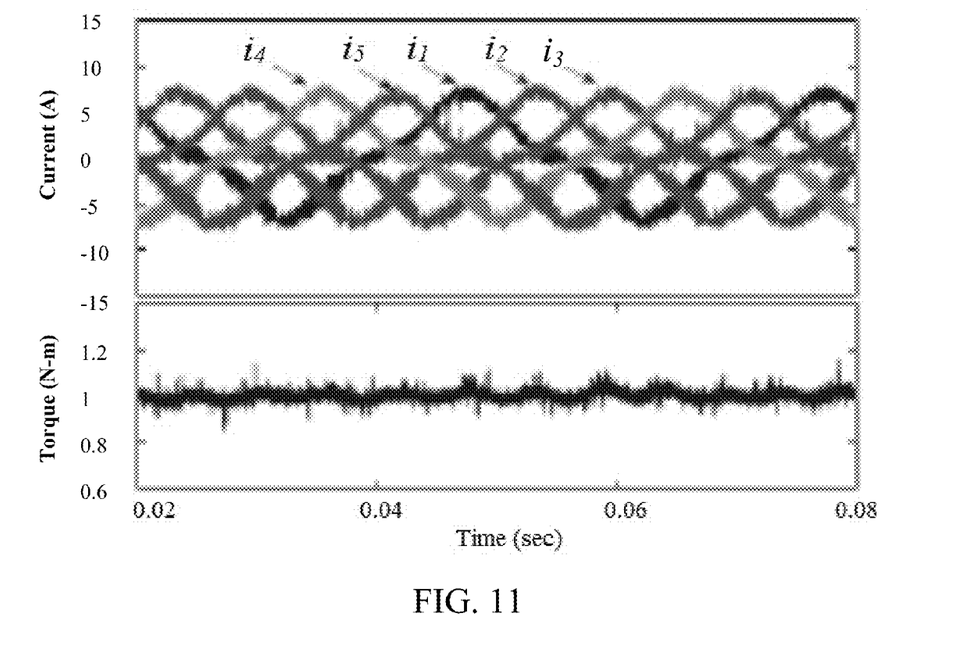
FIG. 11 shows a plot of current (upper portion) and torque (lower portion) versus time for the drive system of FIG. 10.
Figure 13:
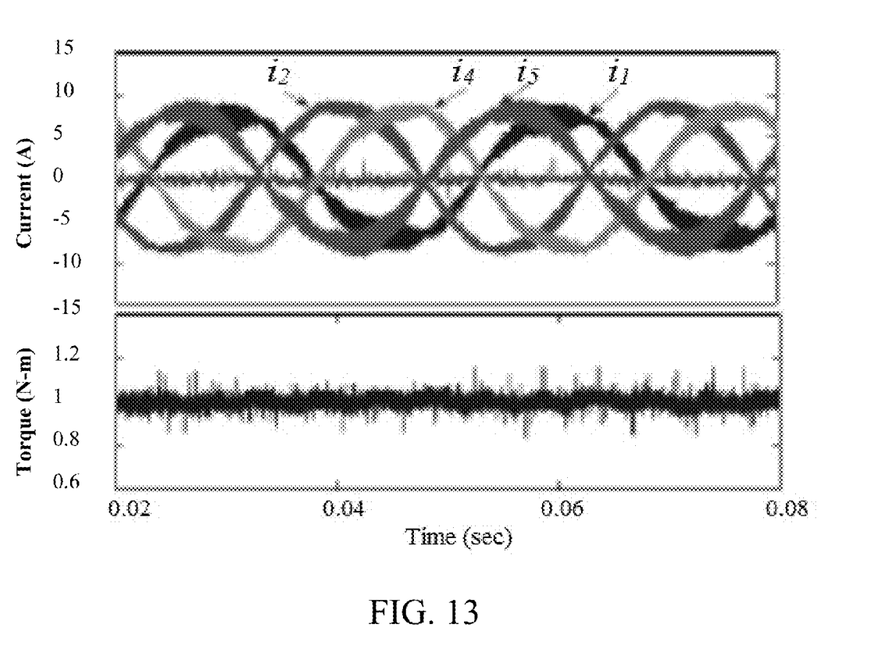
FIG. 13 shows a plot of current (upper portion) and torque (lower portion) versus time for the drive system of FIG. 12.
Figure 15:
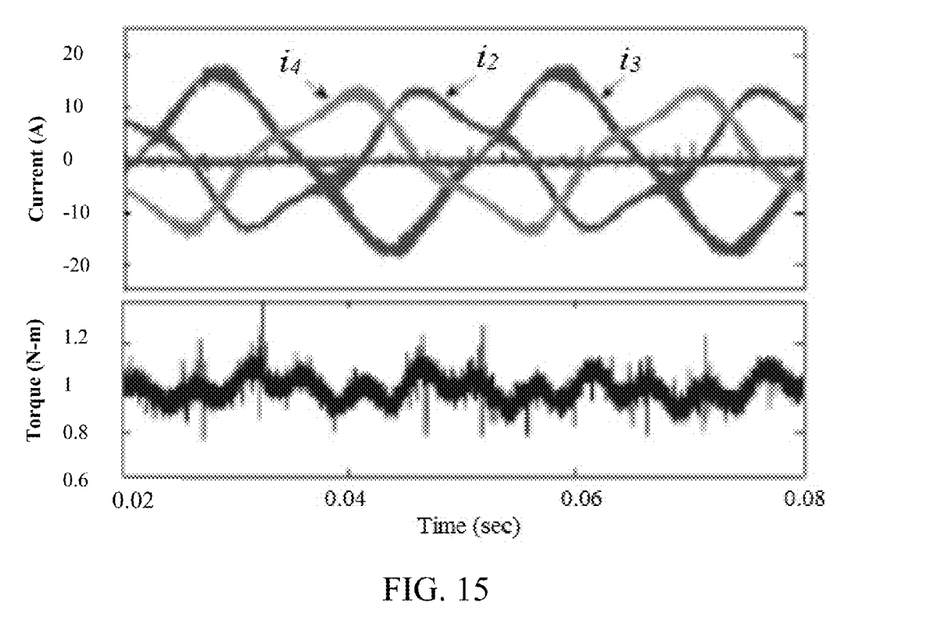
FIG. 15 shows a plot of current (upper portion) and torque (lower portion) versus time for the drive system of FIG. 14.

Steady state tests were conducted with speed reference of 1000 rpm and load torque of about 1 N-m. The test results are shown in FIGS. 11, 13, and 15 for the motor drives of FIGS. 10, 12, and 14, respectively. Each of FIGS. 11, 13, and 15 shows a plot of current (in Amps) vs. time (in seconds) in the top portion and a plot of torque (in N-m) verses time (sec) in the bottom portion.

In the top portion of FIG. 11, the left-most indicator arrow points to the lightest line and is for $i_4$ as labeled on FIG. 10. Moving from left to right as depicted in FIG. 11, the next indicator arrow points to a darker line and is for $i_5$, the indicator arrow in the middle points to the darkest line and is for $i_1$, the indicator arrow to the right of center points to the line for $i_2$, and the right-most indicator arrow points to the line for $i_3$.

In the top portion of FIG. 13, the left-most indicator arrow points to the line for $i_2$ as labeled on FIG. 12. Moving from left to right as depicted in FIG. 13, the next indicator arrow points to the lightest line and is for $i_4$, the next indicator arrow points to a darker line and is for $i_5$, and the right-most indicator arrow points to the darkest line and is for $i_1$.

In the top portion of FIG. 15, the left-most indicator arrow points to the lightest line and is for $i_4$ as labeled on FIG. 14. Moving from left to right as depicted in FIG. 15, the next indicator arrow (in the middle) points to a darker line and is for $i_2$, and the right-most indicator arrow points to the darkest line and is for $i_3$.

FIGS. 11, 13, and 15 show diagrams of converter feeding lines and motor phases for the three test conditions, respectively, along with measured line currents and output torque. Referring to FIG. 11, input currents are a balanced five-phase waveform and the output torque has very small ripple. Referring to FIG. 13, the torque ripple is still small even though the motor is running on only one DC link. Referring to FIG. 15, which shows steady state operation of the five-phase motor under master lane failure, the torque ripple is higher and peak currents are relatively large. However, the motor will continue operation using the healthy lane and two of the phase windings, and this is of paramount importance in safety-critical applications.

Under DC link failure, the symmetrical 1-50 drive will completely fail, but the asymmetrical 2-32 drive is expected to provide up to 60% of nominal torque under slave lane failure and up to 40% percent of nominal torque under master lane failure. Maximum available torque in the asymmetrical design will depend on the failed DC link. Fault conditions and post-fault control strategies for a symmetrical five-phase drive under open-circuit faults are presented in Mohammadpour and Parsa ("A unified fault-tolerant current control approach for five-phase pm motors with trapezoidal back emf under different stator winding connections," Power Electronics, IEEE Transactions on, vol. 28, no. 7, pp. 3517-3527, 2013), which is hereby incorporated by reference in its entirety. Master and slave lane failure of the asymmetrical 2-32 drive are respectively equivalent to adjacent three-phase (A3Ph) fault and adjacent two-phase (A2Ph) fault of the symmetrical single-lane 1-50 drive under pentagon connection. Hysteresis modulation based fault-tolerant current control was used for calculation of healthy phase currents under DC link failure in order to have maximum ripple-free torque with minimum copper loss. The PM motor had a trapezoidal back EMF waveform with 11% of third harmonic component and very small higher frequency component. For motor excitation, only fundamental and third harmonic component of currents were considered and the fundamental component was assumed to be equal for all phases at all conditions (Mohammadpour and Parsa 2013).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

E. Levi, R. Bojoi, F. Profumo, H. Toliyat, and S. Williamson, "Multiphase induction motor drives—a technology status review," Electric Power Applications, IET, vol. 1, no. 4, pp. 489-516, July 2007.

A. Mohammadpour, A. Gandhi, and L. Parsa, "Design and control of fault-tolerant permanent magnet machines," in Electrical Machines Design Control and Diagnosis (WEMDCD), 2013 IEEE Workshop on, 2013, pp. 108-116.

A. El-Refaie, "Fault-tolerant permanent magnet machines: a review," Electric Power Applications, IET, vol. 5, no. 1, pp. 59-74, January 2011.

A. Mohammadpour and L. Parsa, "A unified fault-tolerant current control approach for five-phase pm motors with trapezoidal back emf under different stator winding connections," Power Electronics, IEEE Transactions on, vol. 28, no. 7, pp. 3517-3527, 2013.

A. Mohammadpour, S. Mishra, and L. Parsa, "Iterative learning control for fault-tolerance in multi-phase permanent-magnet machines," in American Control Conference (ACC), 2013, 2013, pp. 5929-5934.

A. Mohammadpour, S. Sadeghi, and L. Parsa, "Fault-tolerant control of five-phase pm machines with pentagon connection of stator windings under open-circuit faults," in Applied Power Electronics Conference and Exposition (APEC), 2012 Twenty-Seventh Annual IEEE, 2012, pp. 1667-1672.

A. Mohammadpour and L. Parsa, "Post-fault control technique for multi-phase pm motor drives under short-circuit faults," in Applied Power Electronics Conference and Exposition (APEC), 2013 Twenty-Eighth Annual IEEE, 2013, pp. 817-822.

X. Kestelyn and E. Semail, "A vectorial approach for generation of optimal current references for multiphase permanent magnet synchronous machines in real-time," Industrial Electronics, IEEE Transactions on, vol. PP, no. 99, p. 1, 2011.

N. Bianchi, S. Bolognani, and M. Pre, "Strategies for the fault-tolerant current control of a five-phase permanent-magnet motor," Industry Applications, IEEE Transactions on, vol. 43, no. 4, pp. 960-970, July-August 2007.

J.-R. Fu and T. Lipo, "Disturbance-free operation of a multiphase current-regulated motor drive with an opened phase," Industry Applications, IEEE Transactions on, vol. 30, no. 5, pp. 1267-1274, September/October 1994.

A. Mohammadpour, S. Sadeghi, and L. Parsa, "A generalized fault-tolerant control strategy for five-phase pm motor drives considering star, pentagon, and pentacle connections of stator windings," Industrial Electronics, IEEE Transactions on, vol. 61, no. 1, pp. 63-75, 2014.

J. Bennett, G. Atkinson, B. Mecrow, and D. Atkinson, "Fault-tolerant design considerations and control strategies for aerospace drives," Industrial Electronics, IEEE Transactions on, vol. 59, no. 5, pp. 2049-2058, 2012.

M. Villani, M. Tursini, G. Fabri, and L. Castellini, "High reliability permanent magnet brushless motor drive for aircraft application," Industrial Electronics, IEEE Transactions on, vol. 59, no. 5, pp. 2073-2081, 2012.

B. Vaseghi, N. Takorabet, J. Caron, B. Nahid-Mobarakeh, F. Meibody-Tabar, and G. Humbert, "Study of different architectures of fault-tolerant actuator using a two-channel pm motor," Industry Applications, IEEE Transactions on, vol. 47, no. 1, pp. 47-54, 2011.

EP0896760 B1 (Control Circuit for Five-Phase Brushless DC Motor)

U.S. Pat. No. 6,426,605 (Multi-phase Induction Motor Drive System and Method)

U.S. Pat. No. 6,710,495 (Multi-phase electric motor with third harmonic current injection)

U.S. Pat. No. 6,791,226 (Multi-phase motor winding topology and control)

U.S. Pat. No. 6,831,430 (High Phase Order Motor with Mesh Connected Windings)

U.S. Pat. No. 7,816,805 (Power Supply System with Multi-phase Motor and Multi-phase Inverter)

U.S. Pat. No. 8,283,881 (Methods, Systems and Apparatus for Synchronous Current Regulation of Five-Phase Machine)

We claim:

1. A motor drive, comprising:
a plurality of lanes electrically isolated from each other, wherein the motor drive is a multi-phase motor drive, and wherein the motor drive has an asymmetrical topology, such that at least one lane of the plurality of lanes has a different number of phases from at least one other lane of the plurality of lanes.

2. The motor drive according to claim 1, wherein each lane comprises a switch.

3. The motor drive according to claim 1, wherein each lane is supplied power by a direct current (DC) link, respectively.

4. The motor drive according to claim 1, wherein each lane is supplied power through a multi-leg inverter, respectively.

5. The motor drive according to claim 1, comprising at least three lanes.

6. The motor drive according to claim 1, wherein the plurality of lanes comprises a master lane and a slave lane, wherein the master lane has a higher number of interconnected phases than the slave lane has.

7. The motor drive according to claim 6, wherein the motor drive is a 5-phase motor drive, and wherein the plurality of lanes comprises a 4-phase master lane and a 1-phase slave lane.

8. The motor drive according to claim 6, wherein the motor drive is a 5-phase motor drive, and wherein the plurality of lanes comprises a 3-phase master lane and a 2-phase slave lane.

9. The motor drive according to claim 6, wherein the motor drive is a 5-phase motor drive, and wherein the plurality of lanes comprises two 2-phase master lanes and a 1-phase slave lane.

10. The motor drive according to claim 6, wherein the motor drive is a 5-phase motor drive, and wherein the plurality of lanes comprises a 3-phase master lane and two 1-phase slave lanes.

11. The motor drive according to claim 6, wherein the motor drive is a 5-phase motor drive, and wherein the plurality of lanes comprises a 2-phase master lane and three 1-phase slave lanes.

12. A method of driving a motor, comprising:
providing the motor drive according to claim 1; and
driving the motor using the motor drive.

13. The method according to claim 12, wherein each lane is supplied power by a direct current (DC) link, respectively, and
wherein each lane is supplied power through a multi-leg inverter, respectively.

14. The method according to claim 12, wherein the motor drive comprises at least three lanes.

15. The method according to claim 12, wherein the plurality of lanes comprises a master lane and a slave lane, wherein the master lane has a higher number of interconnected phases than the slave lane has.

16. The method according to claim 15, wherein the motor drive is a 5-phase motor drive, and wherein the plurality of lanes comprises a 4-phase master lane and a 1-phase slave lane.

17. The method according to claim 15, wherein the motor drive is a 5-phase motor drive, and wherein the plurality of lanes comprises a 3-phase master lane and a 2-phase slave lane.

18. The method according to claim 15, wherein the motor drive is a 5-phase motor drive, and wherein the plurality of lanes comprises two 2-phase master lanes and a 1-phase slave lane.

19. The method according to claim 15, wherein the motor drive is a 5-phase motor drive, and wherein the plurality of lanes comprises a 3-phase master lane and two 1-phase slave lanes.

20. The method according to claim 15, wherein the motor drive is a 5-phase motor drive, and wherein the plurality of lanes comprises a 2-phase master lane and three 1-phase slave lanes.

* * * * *